United States Patent [19]

Matsushima

[11] Patent Number: 4,542,997
[45] Date of Patent: Sep. 24, 1985

[54] METHOD OF AND APPARATUS FOR PRINTING COLORED PATTERNS

[75] Inventor: Keiichi Matsushima, Yokohama, Japan

[73] Assignee: Aimor Denshi Kabushiki Kaisha, Tokyo, Japan

[21] Appl. No.: 675,976

[22] Filed: Nov. 28, 1984

[30] Foreign Application Priority Data

Nov. 30, 1983 [JP] Japan ................................ 58-226254

[51] Int. Cl.$^4$ ......................... B41J 3/02; G01D 15/10
[52] U.S. Cl. ............................... 400/120; 346/76 PH; 400/201
[58] Field of Search ............................... 400/120, 201; 346/76 PH

[56] References Cited

U.S. PATENT DOCUMENTS

| | | | |
|---|---|---|---|
| 3,984,809 | 10/1976 | Dertouzos | 346/76 PH X |
| 4,388,628 | 6/1983 | Moriguchi | 400/120 |
| 4,408,212 | 10/1983 | Moriguchi et al. | 346/76 PH |
| 4,410,898 | 10/1983 | Murayama et al. | 400/120 |
| 4,423,424 | 12/1983 | Takayama | 346/76 PH |

FOREIGN PATENT DOCUMENTS

| | | | |
|---|---|---|---|
| 3,112,871 | 10/1982 | Fed. Rep. of Germany | 400/120 |
| 53391 | 3/1982 | Japan | 400/120 |
| 107858 | 7/1982 | Japan | 400/120 |
| 137182 | 8/1982 | Japan | 400/120 |
| 2100673 | 1/1983 | United Kingdom | 400/120 |
| 2117708 | 10/1983 | United Kingdom | 400/120 |

Primary Examiner—E. H. Eickholt
Attorney, Agent, or Firm—Wenderoth, Lind & Ponack

[57] ABSTRACT

A method of and an apparatus for printing patterns of information of a record sheet, wherein those selected out of a number of printer elements arranged in an array are actuated to heat a succession of differently colored, recurrent colored sections of a variegated, heat-sensitive ink ribbon for producing dots of different colors on the record sheet during each of a predetermined number of dot printing steps of a line printing interval.

13 Claims, 6 Drawing Figures

METHOD OF AND APPARATUS FOR PRINTING COLORED PATTERNS

FIELD OF THE INVENTION

The present invention relates to printers and, more particularly to a method of printing patterns of information such as, for example, alphabetic, numerical and other letters, characters or symbols and graphic patterns in different colors on a record sheet of, for example, paper by application of heat to a variegated, thermally activated inking medium. The present invention also relates to a multi-color thermal printing apparatus adapted to put such a method into practice.

BACKGROUND OF THE INVENTION

A monochromic thermal printer is known which uses as the inking medium a length of relatively broad strip of a film coated with heat-sensitive ink. A standardized version of such an inking medium has a width of about 210 mm and a thickness within the range of from about 10 microns to 30 microns. Because of its width which is relatively large for the thickness, an inking medium of this nature tends to produce wrinkles and to locally deviate on a record sheet or printing paper and can not be wound on a take-up roll smoothly and uniformly.

In an attempt to provide a solution to this problem, it has been proposed to use a thermally activated inking medium of ribbon form having a reduced width of, typically, from about 10 mm to 20 mm as a substitute for the prior inking medium in the form of a broad strip. A thermal printer using such an advanced heat-sensitive inking medium is disclosed in, for example, Japanese Provisional Patent Publication No. 55-55883. The heat-sensitive ink ribbon is coated or impregnated with ink of, usually, black color throughout its length and, for this reason, the thermal printer using the ribbon is not operable for printing patterns of information in different colors.

The applicant has, accordingly, proposed a novel multicolor thermal printing apparatus which exploits all of the advantages attainable by the prior-art thermal printers using a single-colored ink ribbon of the reduced width. This printing apparatus is disclosed in co-pending U.S. patent application Ser. No. 675,393 filed 27th Nov., 1984. The multi-color thermal printing apparatus disclosed therein uses as a printing medium a continuous, variegated heat-sensitive ink ribbon which is coated or impregnated with inks of different colors. The ink ribbon has a series of recurrent, discrete colored sections which are contiguous to one another throughout the length of the ribbon and which consist of first colored sections inked in a first color such as yellow, second colored sections inked in a second color such as magenta and third colored sections inked in a third color such as cyanic blue. The first, second and third colored sections occur, lengthwise of the ribbon, successively and recurrently with a unit series consisting of one first colored section, one second colored section subsequent to the first colored section, and one third colored section subsequent to the second colored section. The first and third colored sections of each unit series are respectively subsequent and preceding to the third and first colored sections of the immediately preceding and subsequent unit series.

During printing operation using such a heat-sensitive parti-colored ink ribbon, the ribbon is driven to travel along an array of heater elements forming a printing head and is caused to frequently stop and restart travelling at predetermined time intervals. In this instance, difficulties are experienced in enabling the ink ribbon to stop in correct positions with respect to the array of the heater heater elements of the printing head. Furthermore, the ink ribbon, which is susceptible to changes in tension and ambient temperature, tends to be caused to shrink over some areas and elongate over other areas during operation of the printer. The local shrinkage and elongation of the ribbon results in fluctuations in the lengths of the individual colored sections of the ribbon and makes it difficult for the ribbon to have the individual colored sections located correctly in registry with those sets of heater elements of the printing head which should be associated with the respective colored sections during each dot printing step. It may thus happen that some or even all sets of heater elements of the printing head are brought into registry with longitudinal portions of the ink ribbon which contain the boundaries between the adjacent colored sections of the ribbon. When a boundary between any adjacent two colored sections of the ink ribbon happens to be located between those two sets of heater elements which should be respectively located in registry with these two colored sections, the dots which should have been printed in a certain color by one of these two colored sections will be printed some in one color and the others in another. This results in unintended distribution of colors in the printed information pattern and possibly further in indistinctness of the pattern from the environment of the record sheet.

The present invention contemplates resolution of these problems. It is, accordingly, an important object of the present invention to provide a novel multicolor thermal printing method and an improved multi-color thermal printing apparatus which are useful for avoiding unintended, objectionable distribution of colors in printed patters of information and for forming printed patterns of information with clear-cut contours even when the ink ribbon may have failed to have some of its colored sections located correctly with respect to the heater elements of the printing head.

SUMMARY OF THE INVENTION

In accordance with one important aspect of the present invention, there is provided a method of printing dots of at least two different colors including first and second colors on a record sheet with use of a printing head having a multiplicity of heater elements which are arranged in an array extending along a substantially straight print line and which are operative to produce heat independently of one another when actuated and an elongated heat-sensitive ink ribbon extending between the record sheet and the array of the heater elements and having a series of recurrent colored sections which are contiguous to one another and which are inked in the aforesaid colors, the heater elements comprising a succession of groups each having a predetermined number of successive subgroups each consisting of a predetermined number of heater elements and forming a zone having a predetermined length, the colored sections of the first and second colors occurring, lengthwise of the ribbon, successively and recurrently with a unit series including one colored section of the first color and one colored section of the second color, all the colored sections of the ink ribbon having a predetermined length, the method having a succession of line forming cycles each for forming a single line of dots in at least one of the aforesaid different colors on the record sheet, each of the line forming cycles consisting of a predetermined number of dot printing steps each comprising driving the record sheet to advance a predetermined distance across the print line in a direction substantially perpendicular to the print line during each of the line forming cycles; driving the ink ribbon to travel a predetermined distance with respect to the printing head in a predetermined direction angled to the direction of travel of the recored sheet during each dot printing step, the predetermined distance of travel of the ink ribbon being substantially equal to the predetermined length of the above mentioned zone and being smaller than the predetermined length of the colored sections of the ink ribbon; on the basis of control signals supplied from an external source, selecting out of the heater elements of the printing head the heater elements to be actuated to generate heat during each dot printing step; and actuating the selected heater elements for producing dots of at least one of the aforesaid colors on the ink ribbon during each dot printing step, wherein the heater elements to be actuated to generate heat during each dot printing step are selected by selecting one of the subgroups of each of the aforesaid groups and selecting particular heater elements out of the heater elements of the non-selected subgroups during each dot printing step, and wherein the predetermined distance of travel of the ink ribbon is selected so that every adjacent two of the colored sections of the ink ribbon have trailing and leading marginal areas, respectively, which are located substantially in registry with the selected one of the aforesaid subgroups during each dot printing step. Prefereably, selected one of the subgroups of the heater elements changes from one of the subgroups of each of the aforesaid groups to another during the successive dot printing steps of each of the line forming cycles. The ink ribbon is preferably driven to travel so that the boundary between every adjacent two of the colored sections thereof is located substantially in registry with the boundary between the aforesaid marginal areas respectively trailing and leading from every adjacent two of the colored sections of the ink ribbon during each dot printing step. Typically, the number of the dot printing steps of each of the line forming cycles is equal to the number of the subgroups of each of the groups of the heater elements. Preferably, the direction of travel of the ink ribbon is inclined to the print line through a predetermined angle less than 90 degrees on a plane on which the ink ribbon is to travel with respect to the printing head. On the other hand, the control signals may comprise a first group of control signals to specify those of aforesaid subgroups of the heater elements which are to be selected during each dot printing step and the time durations for which the selected heater elements are to be maintained actuated during each dot printing step and a second group of control signals to specify those of the heater elements of the selected subgroups during each dot printing step.

In accordance with another important aspect of the present invention, there is provided a multi-color thermal printing apparatus for printing dots of at least two different colors including first and second colors on a record sheet, comprising sheet driving means operative to drive the record sheet in a predetermined direction during an interval consisting of a predetermined number of dot printing steps; a printing head including a multiplicity of heater elements which are arranged in an array extending along a print line substantially perpendicular to the direction of travel of the record sheet and which are operative to produce heat independently of one another when actuated, the heater elements comprising a succession of groups each having a predetermined number of successive subgroups each consisting of a predetermined number of heater elements and forming a zone having a predetermined length; an elongated heat-sensitive ink ribbon extending between the record sheet and the array of the heater elements and having a series of recurrent colored sections which are contiguous to one another and which are inked in the aforesaid colors, the colored sections of the first and second colors occurring, lengthwise of the medium, successively and recurrently with a unit series including one colored section of the first color and one colored section of the second color, all the colored sections of the ink ribbon having a predetermined length; ribbon drive means operative to drive the ink ribbon for movement over a predetermined distance during each dot printing step in a direction which is angled to the direction of travel of the record sheet, the predetermined distance of movement of the ink ribbon being substantially equal to the predetermined length of the above mentioned zone and being smaller than the predetermined length of the colored sections of the ink ribbon; and control means for selecting out of the heater elements of the printing head the heater elements to be actuated to generate heat for producing dots of at least one of the above mentioned colors on the ink ribbon during each dot printing step, the control means being operative to select one of the subgroups of each of the aforesaid groups and selecting out of the heater elements of the non-selected subgroups the particular heater elements to be actuated during each dot printing step, the predetermined distance of travel of the ink ribbon being selected so that every adjacent two of the colored sections of the ink ribbon have trailing and leading marginal areas, respectively, which are located substantially in registry with the selected one of the aforesaid subgroups during each dot printing step. In the printing apparatus thus constructed and arranged, the control means preferably comprises sources of a first control signals representative of particular one of the subgroups of each of the groups of the heater elements during each dot printing step and of the time durations for which selected ones of the heater elements are to be maintained actuated during each dot printing step, sources of a second group of control signals representative of the pattern of information to be printed during each dot printing step, zone select control means responsive to the first group of control signals and operative to produce output signals each representative of the above mentioned particular one of the subgroups of each of the aforesaid groups, and selective heater actuation means responsive to the second group of control signals and to the output signals from the zone select control means and operative to select at least one of the heater elements from each of the aforesaid non-selected subgroups of each of the aforesaid groups on the basis of the second group of control signals. In this instance, the first group of control signals may include zone select control signals produced sequentially during each dot printing step and representative of the aforesaid particular one of the subgroups of each of the groups of the heater elements during each dot printing step and duration control signals produced concurrently during each dot printing step and representative of the durations for which selected ones of the heater elements are to be actuated during each dot printing step, the zone select control means comprising a plurality of zone select control circuits each of which is responsive to at least one of the zone select control signals and to each of the duration control signals during each dot printing step, each of the zone select control circuits being operative to produce an output signal in the presence of one of the zone select control signals and one of the duration control signals.

BRIEF DESCRIPTION OF THE DRAWINGS

The drawbacks of a prior-art multi-color thermal printing apparatus and the features and advantages of a method and an apparatus according to the present invention will be more clearly understood from the following description taken in conjunction with the accompanying drawings in which like reference numerals and characters designate similar or corresponding assemblies, units, and elements and in which.

DESCRIPTION OF THE PRIOR ART

Figure 1:
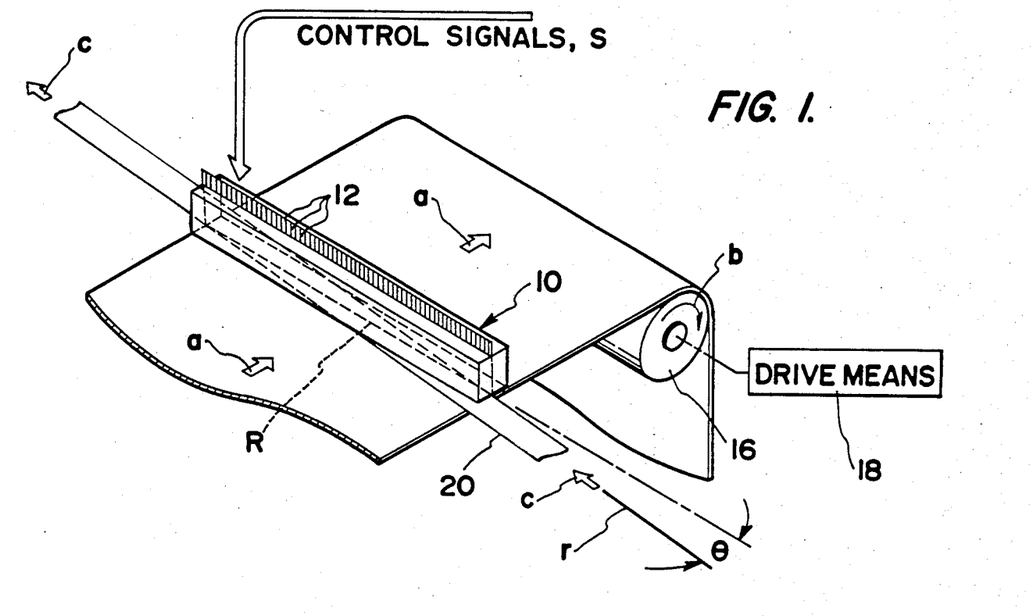
FIG. 1 is a perspective view showing part of a prior-art monochromic thermal printer of the described type.

Referring to FIG. 1 of the drawings, there is shown a prior-art thermal printer of the type which is taught in Japanese Provisional Patent Publication No. 55-55883. The known thermal printer includes a printing head 10 having a multiplicity of heater elements 12. The printing head 10 extends in a direction perpendicular to the direction of arrow a in which a record sheet 14 of paper is to be driven to travel during operation of the printer. The heater elements 12 are arranged in an array along the printing head 10 and thus define a print line R perpendicular to the direction a of travel of the record sheet 14. The individual heater elements 12 are jointly connected to a common source (not shown) of electric power and are selectively energized during each dot printing step under the control of signals S which contain those indicative of the patterns to be printed on the record sheet 14. As the succession of dot printing steps proceeds, the record sheet 14 is driven to stepwise advance past the printing head 10 in the direction of the arrow a by the aid of feed rolls one of which is shown at 16. The feed roll 16 is connected to suitable drive means 18 and is driven for rotation in the direction of arrow b by the drive means 18. Between the printing head 10 and the record sheet 14 is provided a continuous heat-sensitive ink ribbon 20 which is coated or impregnated with ink of, usually, black color as previously mentioned. The ink ribbon 20 extends in a direction r inclined to the above mentioned print line R through a predetermined angle $\theta$ and is driven to travel a predetermined distance in this direction during each dot printing step as indicated by arrow c.

The ink ribbon 20 used in the prior-art thermal printer constructed and arranged as described above is inked in a single color throughout its length and, for this reason, the printer can not be utilized to print patterns of information in different colors. The mechanical construction of the thermal printer of the described type is however operable as a multi-color thermal printer if a variegated ink ribbon is used in lieu of the monochromic ink ribbon 20 and if suitable control means is provided to control selective actuation of the heater elements 12 of the printing head 10 in relation to the differently colored sections of the variegated ribbon.

Figure 2:
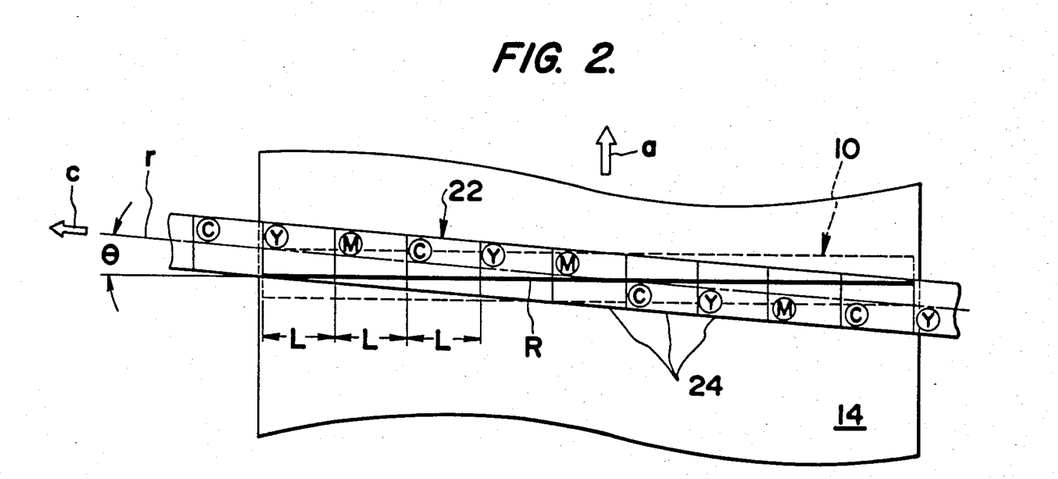
FIG. 2 is a schematic plan view showing the arrangement of an ink ribbon used as a variegated, heat-sensitive inking medium when the prior-art printing apparatus shown in FIG. 1 is modified for use as a multi-color thermal printing apparatus.

FIG. 2 shows a portion of an example of such a variegated ink ribbon and the arrangement in which the ribbon, denoted by reference numeral 22, is provided over the record sheet 14 in the arrangement in which the thermal printer of the construction shown in FIG. 1 is used for multi-color printing purposes. As shown, the valiegated ink ribbon 22 has a series of recurrent, discrete colored sections 24 which are contiguous to one another throughout the length of the ribbon 22 and which consist of yellow colored sections Y, magenta colored sections M and cyanic blue colored sections C.

In operation, the variegated ink ribbon 22 is driven to lengthwise travel a distance equal to the length L of each of the colored sections Y, M and C of the ribbon during each dot printing step and leftwardly in the direction r as indicated by arrow c in FIG. 2. After being moved this distance, the ink ribbon 22 is held at rest on the record sheet 14 and extends at the angle $\theta$ with respect to the print line R. The heater elements 12 of the printing head 10 are then selectively actuated to generate heat under the control of the signals S supplied to the printing head 10. The colored sections Y, M and C of the ink ribbon 22 are subjected to heat at the spots which register with the actuated ones of the heater elements 12 and produce on the surface of the record sheet 14 dots of one, two or all of the colors of the colored sections Y, M and C of the ink ribbon 22. If, thus, those heater elements 12 of the printing head 10 which are located in registry with one of, for example, the yellow colored sections Y of the ink ribbon 22 are actuated in response to the signals S, the particular colored section Y is subjected to the heat generated by these heater elements 12 and is caused to produce yellow colored dots on the surface of the record sheet 14 at the spots which are located in registry with the particular heater elements 12.

At the end of the first dot printing step, all the heater elements 12 of the printing head 10 that have been actuated during the first dot printing step are de-energized and the ink ribbon 22 is driven to lengthwise travel a distance equal to the length L of each colored section. It therefore follows that the set of heater elements 12 which has been associated with the above mentioned yellow colored section Y of the ink ribbon 22 during the first dot printing step is brought into registry with the magenta colored section M immediately subsequent to the yellow colored section Y under consideration, whereby the particular magenta colored section M is subjected to the heat generated by these particular heater elements 12 and is caused to produce magenta colored dots on the surface of the record sheet 14. In this instance, the magenta colored dots are produced at spots located among the yellow colored dots printed during the first dot printing step. During the second dot printing step, the set of heater elements 12 located to the left of the first set of heater elements 12 in FIG. 2 registers with that yellow colored section Y which has been subjected to heat during the first dot printing step and causes the particular colored section Y of the ink ribbon 22 to produce yellow colored dots on the surface of the record sheet 14. These yellow colored dots are located among the cyanic blue colored dots printed on the record sheet 14 during the first dot printing step.

Subsequently to this second dot printing step, the ink ribbon 22 is further driven to travel a distance equal to the length L of each colored section. The result is that the set of heater elements 12 which has been associated with the aforesaid magenta colored section M of the ink ribbon 22 during the second dot printing step is brought into registry with the cyanic blue colored section C immediately subsequent to the particular magenta colored section M. The cyanic blue colored section C is thus subjected to the heat generated by this set of heater elements 12 and is caused to produce cyanic blue colored dots on the surface of the record sheet 14. The cyanic blue colored dots thus produced on the record sheet 14 are located among the yellow colored dots printed during the first dot printing step and the magenta colored dots printed during the second dot printing step. During the third dot printing step, the second set of heater elements 12 of the printing head 10 is brought into registry with the magenta colored section M which has been subjected to heat during the second dot printing step and causes the particular colored section M to produce magenta colored dots on the surface of the record sheet 14. These magenta colored dots are located among the cyanic blue colored dots printed during the first dot printing step and the yellow colored dots printed during the second dot printing step. During the third dot printing step, furthermore, the set of heater elements 12 located to the left of the second set of heater elements 12 is brought into registry with that yellow colored section Y of the ink ribbon 22 which has been subjected to heat during the first and second dot printing steps and causes the particular yellow colored section Y to produce yellow colored dots on the surface of the record sheet 14. These yellow colored dots are located among the magenta colored dots printed during the first dot printing step and the cyanic blue colored dots printed during the second dot printing step.

Yellow, magenta and cyanic blue colored dots are in these manners printed on the surface of the record sheet 14 along and throughout the print line R by the end of the consecutive three dot printing steps. Upon termination of these three consecutive dot printing steps, the drive means 18 associated with the feed roller 16 (FIG. 1) is actuated to drive the record sheet 14 to advance a predetermined distance in the direction of the arrow a. By repetition of the three consecutive dot printing steps, patterns of information are thus printed in yellow, magenta and cyanic blue on the surface of the record sheet 14 in accordance with the pattern and color distribution data represented by the printing information signals contained in the signals S supplied to the printing head 10. As the ink ribbon 22 is driven to travel stepwise, the ink ribbon 22 skews across the print line R and is subjected to heat from the front longitudinal edge of the ribbon toward the rear longitudinal edge thereof.

During operation of the printing apparatus as above described, the drive means 18 for the ink ribbon 22 is controlled to frequently stop and restart the travel of the ribbon 22 at predetermined time intervals. It has been found that some difficulties are experienced in enabling the ink ribbon 22 to stop in correct positions with respect to the array of the heater elements 12 of the printing head 10. Furthermore, the ink ribbon 22 which is susceptible to changes in tension and ambient temperature tends to locally shrink and elongate during operation of the printer. The localized shrinkage and elongation of the ink ribbon 22 results in fluctuations in the effective lengths of the individual colored sections Y, M and C and makes it difficult for the ink ribbon 22 to have its colored sections Y, M and C located correctly in registry with those sets of heater elements 12 of the printing head 10 which should be associated with the respective colored sections Y, M and C during each dot printing step. It may thus happen that some or even all sets of heater elements 12 of the printing head 10 are brought into registry with longitudinal portions of the ink ribbon 22 which contain the boundaries between the adjacent colored sections Y, M and C. If a boundary between any adjacent two colored sections of the ink ribbon 22 happens to be located between those two sets of heater elements 12 which should be respectively located in registry with these two colored sections, the dots which should have been printed in a certain color by one of these two colored sections will be printed some in one color and the others in another. This results in unintended distribution of colors in the printed pattern of information and possibly further in indistinctness of the pattern from the environment of the record sheet 14, as previously noted.

Thus, the present invention contemplates provision of useful solutions to these problems for avoiding unintended, objectionable distribution of colors in printed patters of information and for forming printed patterns of information with clear-cut contours even when the ink ribbon 22 may have failed to have some of its colored sections Y, M and C located correctly with respect to the heater elements 12 of the printing head 10 in the arrangement shown in FIG. 1.

DESCRIPTION OF THE PREFERRED EMBODIMENT

Figure 3:
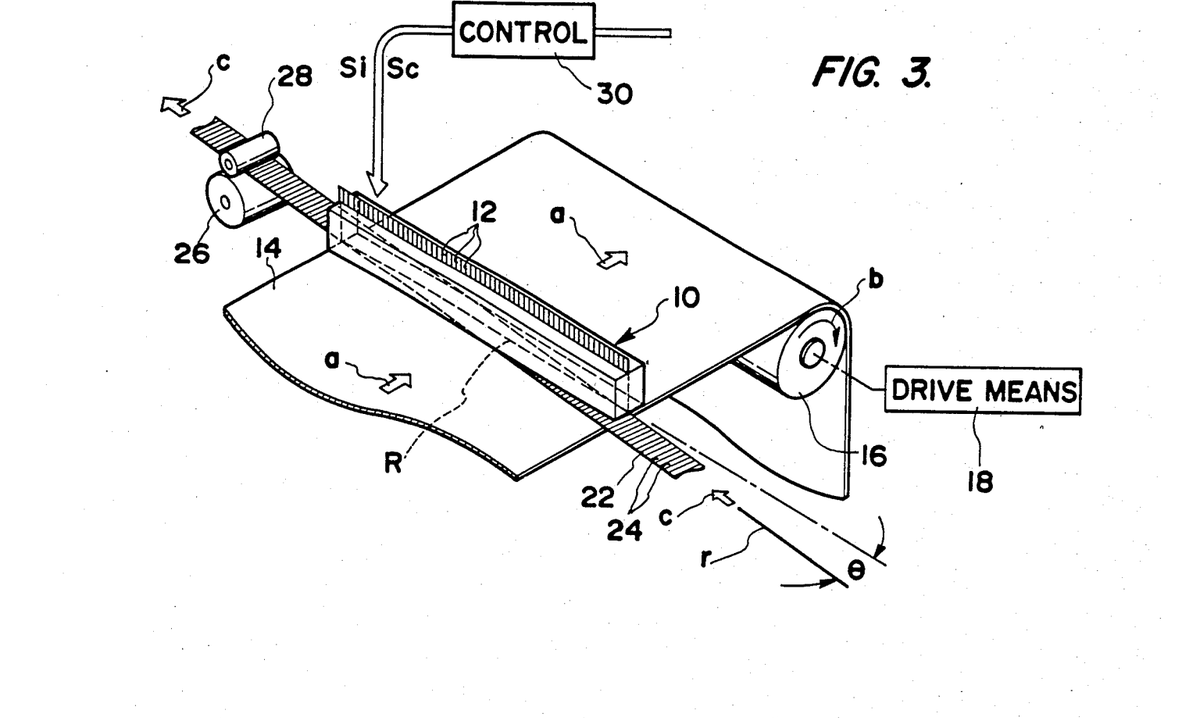
FIG. 3 is a view similar to FIG. 1 but shows the mechanical arrangement of a preferred embodiment of a multi-color thermal printing apparatus according the present invention.

Referring to FIG. 3 of the drawings, a multi-color thermal printing apparatus embodying the present invention is shown, by way of example, as being basically similar in mechanical construction to the prior-art monochromic thermal printer of the type described with reference to FIG. 1. Thus, those members and elements which have their counterparts in the thermal printer of FIG. 1 are designated by like reference numerals in FIG. 3.

The multi-color thermal printing apparatus shown in FIG. 3 comprises a printing head 10 having a multiplicity of heater elements 12 and positioned over a suitable platen (not shown). The printing head 10 longitudinally extends in a direction perpendicular to the direction of arrow a in which a record sheet 14 of, for example, paper lying on the platen is to be driven to travel during operation of the printer. The heater elements 12 are arranged in a linear array along the printing head 10 and thus define a straight print line R perpendicular to the direction a of travel of the record sheet 14. The individual heater elements 12 are jointly connected to a common source (not shown) of electric power and are selectively energized during each dot printing step under the control of signals supplied to a control circuit 30 from a suitable external source or sources (not shown). The signals thus supplied to the control circuit 30 are herein assumed to consist of printing information signals $S_i$ and print control signals $S_c$. The printing information signals $S_i$ are indicative of the patterns and color distribution of the information to be printed and are used for the selective actuation of the individual heater elements 12 of the printing head 10. As will be described in detail, the printing information signals $S_i$ are supplied in the form of logic 0 and/or 1 pulses from an external source such as a computer and are representative of the patterns and color distributions of the dots to be printed on the record sheet 14. Thus, the printing information signals $S_i$ contain the data regarding the patterns of alphabetic, numerical and other letters, characters or symbols or the graphic patterns to be printed and the distribution of colors of the dots to form such patterns. On the other hand, the print control signals $S_c$ are effective to determine which of the heater elements 12 of the printing head 10 are to be actuated during each dot printing step and the durations for which the selected heater elements 12 are to be maintained energized during the dot printing step, such durations varying with the colors in which prints are to be produced. The print control signals $S_c$ are also supplied in the form of logic 0 and/or 1 pulses from a suitable pulse distribution circuit (not shown) which may form part of the control circuit 30. As the succession of dot printing steps proceeds, the record sheet 14 is intermittently driven to advance past the printing head 10 in the direction of the arrow a by the aid of feed rolls one of which, indicated at 16, is driven for rotation in the direction of arrow b by suitable drive means 18, the other roll being held in rolling engagement with the driven roll across the record sheet 14.

Between the printing head 10 and the record sheet 14 or, more exactly, the printing head 10 and the above mentioned platen is provided a continuous, variegated heat-sensitive ink ribbon 22 which is coated or impregnated with inks of different colors and which is stretched between suitable feed and take-up means such as a feed reel and a take-up reel, though not shown in the drawings. These feed and take-up means are disposed so that the ink ribbon 22 extends in a direction of arrow r inclined to the print line R through a predetermined acute angle $\theta$ as in the case of the prior-art printer arrangement shown in FIG. 1. The ink ribbon 22 is similar to the ink ribbon described with reference to FIG. 2 and also has a series of recurrent, discrete colored sections 24 which are contiguous to one another throughout the length of the ink ribbon 22. The ink ribbon 22 is driven to travel in this direction during each dot printing step as indicated by arrow c. Being thus arranged to skew across the print line R, the ink ribbon 22 is subjected to heat from one longitudinal edge of the ribbon toward the other as the dot printing steps proceed and can therefore be used up practically throughout the width thereof. In this instance, it will be apparent that such an advantage can be achieved by selecting the angle $\theta$ to be larger than 0 degrees and smaller than 90 degrees. The ink ribbon 22 is driven to travel in the direction of the arrow r by suitable ribbon drive means which is shown comprising a combination of rollers 26 and 28 at least one of which is mechanically connected to, for example, a suitable driving source such as a motor (not shown), the other of the rollers being held in rollable contact with the driven roller. Though not shown in the drawings, there is further provided ribbon drive control means adapted to drive the ink ribbon 22 to stepwise travel a predetermined distance l during each dot printing step. The distance of travel l of the ink ribbon 22 during each dot printing step is selected to be smaller than the length L of each of the colored sections 24 of the ink ribbon 22 and is herein assumed, by way of example, as being approximately equal to three quarters of the length L.

The heater elements 12 of the printing head 10 may be formed by the use of a photolithographic technology used for the fabrication of semiconductor integrated circuits. For this purpose, a thin film of a conductor patterned in the form of a comb may be formed on a substrate by a photolithographic process with resistor elements located respectively at the tips of the individual teeth of the pattern. The printing head having the heater elements formed in this fashion is known as a multi-stylus pen and is adapted to generate heat in each of the heater elements independently of the others. The above mentioned printing information signals $S_i$ are supplied respectively to the individual heater elements 12 or individual pairs of adjacent heater elements 12 of such a multistylus pen printing head 10 through the control circuit 30.

Figure 4:
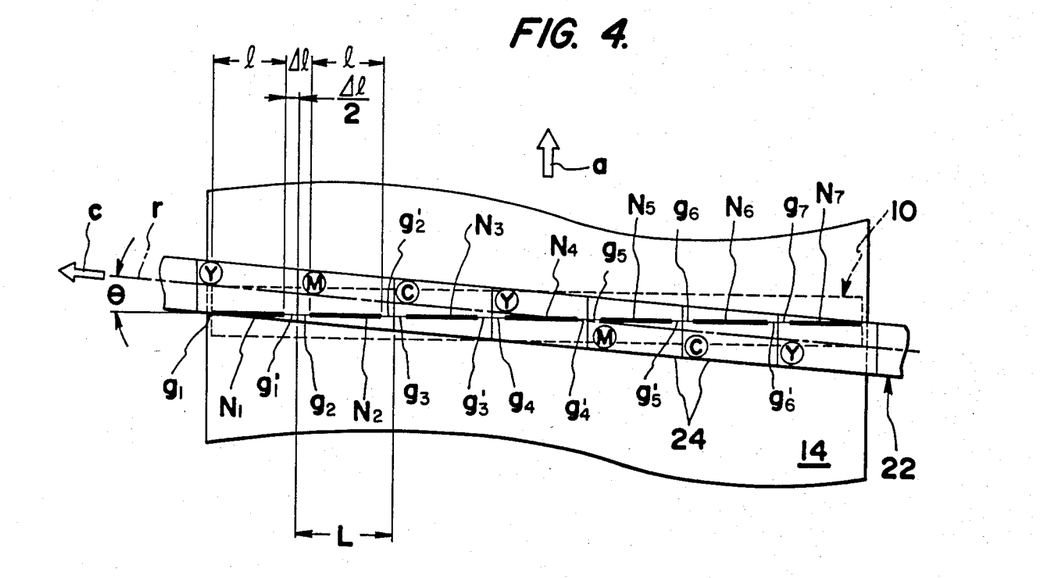
FIG. 4 is a schematic plan view showing the arrangement of the variegated, heat-sensitive ink ribbon extending along the print line in the printing apparatus shown in FIG. 3.

FIG. 4 shows the arrangement of the variegated ink ribbon 22 used as a thermally activated inking medium in the printing apparatus shown in FIG. 3. The discrete colored sections 24 of the ink ribbon 22 consist of first-colored sections Y inked in a first color, second-colored sections M inked in a second color and third-colored sections C inked in a third color. The first-colored, second-colored and third-colored sections Y, M and C occur, lengthwise of the ribbon, successively and recurrently with a unit series consisting of one first-colored section Y, one second-colored section M subsequent to the first-colored section C, and one third-colored section C subsequent to the second-colored section M. The first-colored and third-colored sections Y and C of each unit series are respectively subsequent and preceding to the third-colored and first-colored sections C and Y of the immediately preceding and subsequent unit series. Each of the colored sections Y, M and C of the ink ribbon 22 thus formed has a predetermined length L as shown. By way of example, the first-colored sections Y, second-colored sections M and third-colored sections C of the ink ribbon 22 used in the shown embodiment are assumed to be inked in yellow, magenta and cyanic blue, respectively.

In operation, the above mentioned ribbon drive means including the rollers 26 and 28 (FIG. 3) is actuated to drive the ink ribbon 22 to lengthwise travel a predetermined distance l less than the length L of each of the colored sections Y, M and C of the ribbon during each dot printing step and leftwardly in the direction r as indicated by arrow c in FIG. 3. After being moved the distance l, the ink ribbon 22 is held at rest on the record sheet 14 and extends at the angle $\theta$ with respect to the print line R defined by the heater elements 12 of the printing head 10. Under this condition, each of the colored sections Y, M and C of that portion of the ink ribbon 22 which extends from one end of the print line R to the other is associated with and located underneath a predetermined number of heater elements 12 of the printing head 10. Of the heater elements 12 thus located above each of the colored sections Y, M and C of the ink ribbon 22, selected ones of another predetermined number of heater elements 12 are actuated or electrically energized to generate heat under the control of the print control signals $S_c$ and the printing information signals $S_i$ supplied to the control circuit 30. Each of the colored sections Y, M and C of the ink ribbon 22 is subjected to heat at the spots which register with the actuated ones of the heater elements 12 and produces on the surface of the record sheet 14 dots of one, two or all of the colors of the first-colored, second-colored and third-colored sections Y, M and C of the ink ribbon 22. If, thus, some of the heater elements 12 of the printing head 10 which are located in registry with one second-colored section M of the ink ribbon 22 are actuated in response to the signals $S_c$ and $S_i$, the particular colored section M is subjected to the heat generated by these heater elements 12 and is caused to produce magenta colored dots on the surface of the record sheet 14 at the spots which are located in registry with the heater elements 12 actuated.

As will be understood from the above description, not all of the heater elements 12 located in registry with each of the colored sections Y, M and C of the ink ribbon 22 are electrically energized during each dot printing step. If, thus, it is assumed that a first number of heater elements 12 are located in registry with each of the colored sections Y, M and C of the ink ribbon 22 over a distance equal to the length L of each colored section of the ink ribbon 22 along the print line R, only selected ones of a smaller, second number of heater elements 12 out of the first number of heater elements 12 are actuated. In other words, the first number of heater elements 12 located in registry with each of the colored sections of the ink ribbon 22 during a dot printing step consist of a second number of "operable" or candidate heater elements 12 which are qualified to be actuated and two sets of heater elements 12 each set of which consists of a third number of "inoperable" heater elements 12 which are to stay inoperative throughout the dot printing step. The two sets of inoperable heater elements 12 included in the first number of heater elements 12 located in registry with each of the colored sections Y, M and C of the ink ribbon 22 are preceding from and subsequent to the leading and trailing ends, respectively, of the set of operable heater elements 12. Thus, the set of heater elements 12 located over the length L along each of the colored sections Y, M and C forms an operable heater element zone of a length equal to the above mentioned distance l and two inoperable heater element zones (indicated at $g_1$, $g_1'$; $g_2$, $g_2'$; ... in FIG. 4) respectively leading and trailing from the operable heater element zone and each having a length $\Delta l/2$ $(=(L-l)/2)$ as will be seen from FIG. 4. In FIG. 4, the operable heater element zones of the printing head 10 which register with the successive colored sections 24, respectively, of the ink ribbon 22 are denoted by $N_1$, $N_2$, $N_3$, ... $N_7$ and these zones $N_1$, $N_2$, $N_3$, ... $N_7$ are shown located in registry with the colored sections Y, C, M, ... Y, respectively, by way of example. Between the operable heater element zones registering with every adjacent two of the colored sections Y, M and C of the ink ribbon 22 are located heater elements 12 of a number doubling the above mentioned third number and accordingly forming a clearance area having a length $\Delta l$.

In FIG. 4, there are shown a clearance zone $g_1'+g_2$ located between the operable heater element zones $N_1$ and $N_2$, a clearance zone $g_2'+g_3$ located between the operable heater element zones $N_2$ and $N_3$, and so forth. The length l of each operable heater element zone being assumed to be approximately equal to three quarters of the length L as previously noted, the length $\Delta l$ of the clearance zones $g_1'+g_2$, $g_2'+g_3$, $g_3'+g_4$, $g_4'+g_5$, $g_5'+g_6$ and $g_6'+g_7$ thus formed by the heater elements 12 between the adjacent operable heater element zones $N_1$, $N_2$, $N_3$, ... $N_7$ is approximately equal to a quarter of the length L of each colored section of the ink ribbon 22. The line which bisects each of these clearance zones, viz., the boundary between every adjacent inoperable heater element zones is located in registry with the boundary between adjacent two of the colored sections Y, M and C of the ink ribbon 22 so that each of the colored sections has leading end trailing marginal areas which register with the inoperable heater element zones respectively leading and trailing from each of the operable heater element zones $N_1$, $N_2$, $N_3$, ... $N_7$. The length l of each operable heater element zone being assumed to be approximately equal to three quarters of the length L, each of these leading and trailing marginal areas has a length which accounts for one eighth of the length L of each of the colored sections of the ink ribbon 22. During each dot printing step, the operable heater element zones $N_1$, $N_2$, $N_3$, ... $N_7$ are formed by certain combinations of the heater elements 12 on the basis of the print control signals $S_c$ supplied to the control circuit 30 (FIG. 3) and, furthermore, some of the heater elements 12 forming each of the operable heater element zones thus formed are selected on the basis of the printing information signals $S_i$ also supplied to the control circuit 30. The heater elements 12 selected in these manners are electrically actuated to produce heat for time durations dictated by the print control signals $S_c$. The apparatus embodying the present invention is assumed to have line forming cycles each consisting of four consecutive dot printing steps by way of example and, thus, a line of dots of different colors is printed by four consecutive steps of printing dots on the record sheet 14. The above mentioned combinations of the heater elements 12 to form the operable heater element zones $N_1$, $N_2$, $N_3$, ... $N_7$ vary from one of these four dot printing steps to another and are varied in such a manner that the individual operable heater element zones $N_1$, $N_2$, $N_3$, ... $N_7$ are displaced leftwardly of the drawings over a distance equal to the length l of each of the zones during each dot printing step, as will be understood more clearly as the description proceeds. In this instance it may be noted that, while the operable heater element zones are thus displaced along the print line R during, viz., at the end or at the beginning of each dot printing step, the heater elements 12 to form such "movable" zones are per se fixedly held in situ. The print control signals $S_c$ used in the apparatus embodying the present invention are thus effective to dictate the time durations for which the selected heater elements 12 are to be actuated during each dot printing step and to have the operable heater element zones $N_1$, $N_2$, $N_3$, ... $N_7$ formed by such variable combinations of the heater elements 12 during successive dot printing steps of each line forming cycle. As the dot printing steps proceed, not only the ink ribbon 22 but also the operable heater element zones $N_1$, $N_2$, $N_3$, ... $N_7$ of the heater head 10 are stepwise displaced leftwardly in the drawings over the distance length l of the zones $N_1$, $N_2$, $N_3$, ... $N_7$.

The respective relative positions of these zones with respect to the individual colored sections of the ink ribbon 22 are therefore maintained unchanged throughout the dot printing steps of each line forming cycle although the locations of the zones $N_1$, $N_2$, $N_3$, ... $N_7$ and the colored sections of the ink ribbon 22 with respect to the printing head 10 are per se changed from one of the dot printing steps to another during each line forming cycle, as will be better seen from diagrams (A) to (E) of FIG. 5. The respective positions of the operable heater element zones with respect to the colored sections of the ink ribbon 22 being thus maintained throughout each line forming cycle, each of the colored sections has a predetermined length of "effective" printing area which registers with each of the operable heater element zones of the printing head 10, leaving "ineffective" areas registering with the above mentioned inoperable heater element zones, respectively, leading and trailing from each operable heater element zone.

Figure 5:
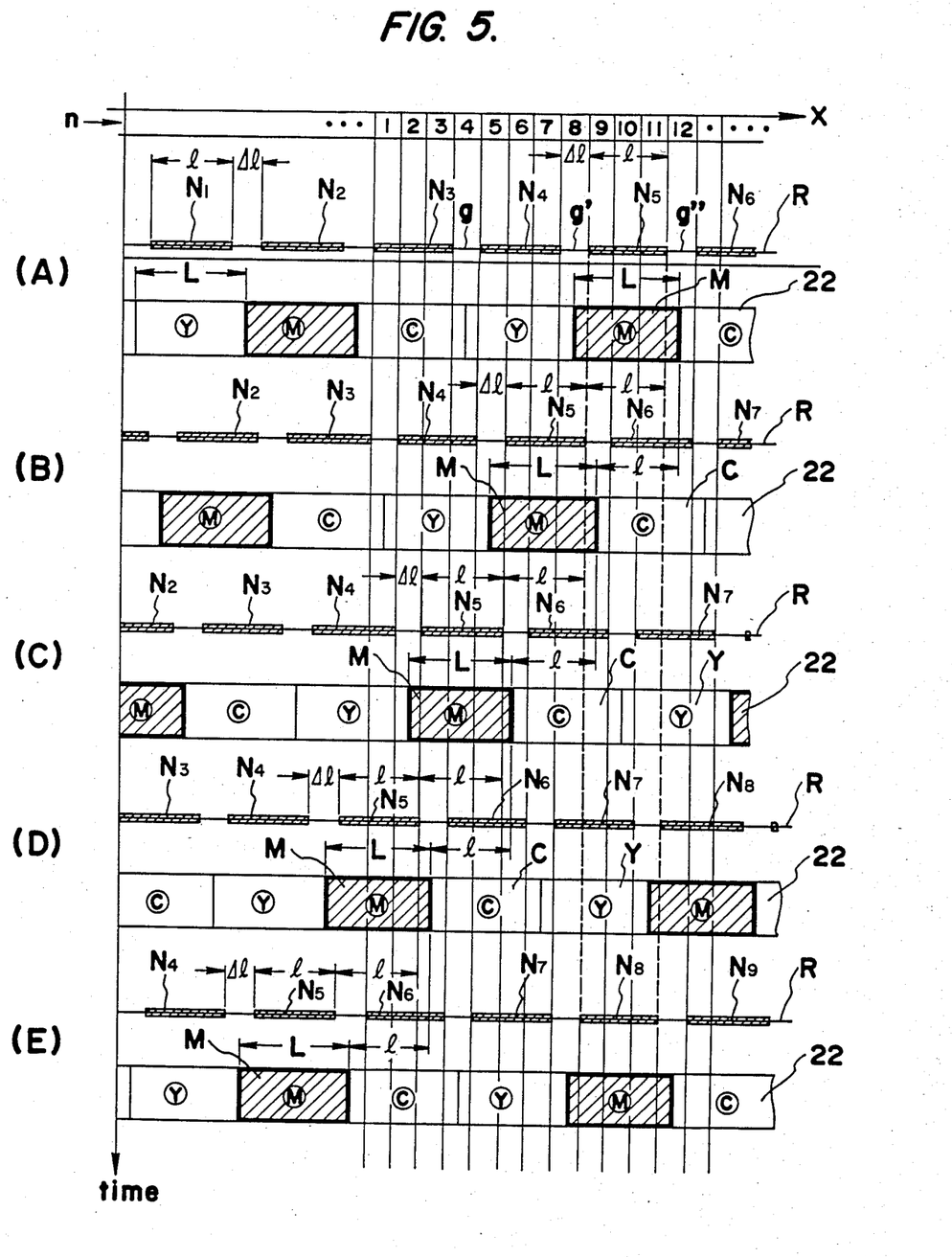
FIG. 5 is a view showing examples of the relationship, achieved during the consecutive dot printing steps of a complete line forming cycle, between a succession of colored sections of the ink ribbon and a succession of unit heating zones of the printing head in the printing apparatus shown in FIG. 3 and controlled by the circuitry including the network illustrated in FIG. 5.

At the end of or upon termination of the first dot printing step, all the heater elements 12 of the printing head 10 that have been actuated during the first dot printing step are de-energized and the ink ribbon 22 is driven to lengthwise travel the distance l from the initial position indicated in the diagram (A) of FIG. 5 to the position indicated in the diagram (B) of FIG. 5. The set of heater elements 12 which have located in registry with the first second-colored section M of the ink ribbon 22 during the first dot printing step are now located some in registry with a trailing end portion of the effective printing area of the same colored section M and the others in registry with a major portion of the effective printing area of the third-colored colored section C immediately subsequent to the particular colored section M. Thus, the trailing end portion of the effective printing area of the preceding colored section M (which portion accounts for one eighth of the total area of the section M) and the major portion of the effective area of the subsequent colored section C (which portion accounts for five eighths of the total area of the section C) are subjected to the heat generated by these particular heater elements 12. Magenta and cyanic blue colored dots are therefore produced on the surface of the record sheet 14 at the spots which are located in registry with the heater elements 12 under consideration. During the second dot printing step, furthermore, the operable heater element zones $N_1$, $N_2$, $N_3$, ... $N_7$ of the printing head 10 are formed by the second numbers of heater elements 12 located immediately to the left of the second number of heater elements 12 which formed the operable heater element zones $N_1$, $N_2$, $N_3$, ... $N_7$, respectively, during the first dot printing step and are invariably held in registry with the colored sections Y, M, C, ... Y, respectively, of the ink ribbon 22 as will be seen from the diagram (B) of FIG. 5.

Subsequently to the second dot printing step, the ink ribbon 22 is further driven to travel the distance l from the position indicated in the diagram (B) of FIG. 5 to the position indicated in the diagram (C) of FIG. 5. The set of heater elements 12 which have been located in registry with the effective printing areas of the second-colored and third-colored sections M and C of the ink ribbon 22 during the second dot printing step as above discussed are now located some in registry with the trailing half portion of the effective printing area of the same third-colored C and the others in registry with the leading half portion of the effective printing area of the first-colored colored section Y immediately subsequent to the particular third-colored C. Thus, the trailing half portion of the effective printing area of the preceding colored section C and the leading half portion of the effective printing area of the subsequent colored section Y are subjected to the heat generated by the heater elements 12 under consideration. Cyanic blue and yellow colored dots are therefore produced on the surface of the record sheet 14 at the spots which are located in registry with these particular heater elements 12.

Upon termination of the third dot printing step, the ink ribbon 22 is further driven to travel the distance l from the position indicated in the diagram (C) of FIG. 5 to the position indicated in the diagram (D) of FIG. 5. The set of heater elements 12 which have been located in registry with the effective printing areas of the third-colored and first-colored sections C and Y of the ink ribbon 22 during the third dot printing step as above discussed are now located some in registry with the major portion of the effective printing area of the same first-colored section Y and the others in registry with the leading end portion of the effective printing area of a second second-colored colored section M immediately subsequent to the particular first-colored section Y. The major portion of the effective printing area of the preceding colored section Y (which portion accounts for five eighths of the total area of the section Y) and the leading end portion of the effective printing area of the subsequent second second-colored section M (which portion accounts for one eighth of the total area of the section M) are subjected to the heat generated by the heater elements 12 under consideration. Yellow and magenta colored dots are therefore produced on the surface of the record sheet 14 at spots which are located in registry with these particular heater elements 12. By these four successive dot printing steps, a line composed of dots of the three different colors is printed on the record sheet 14 possibly throughout the linear array of the heater elements 12 which were located in registry with the first second-colored section M of the ink ribbon 22 during the first dot printing step and accordingly throughout the width of the record sheet 14 possibly by all of the heater elements 12 of the printing head 10.

From the above description it will be understood that the heater elements 12 to be actuated fo generate heat during each dot printing step are selected by selecting, as a clearance area, one of the four subgroups of each of the groups, such as the subgroups $n_1$, $n_2$, $n_3$, ... $n_4$ of the group $N_1$, of the heater elements 12 and then selecting particular heater elements 12 out of the heater elements 12 of the non-selected subgroups such as the subgroups $n_1$ to $n_3$ not selected during the first dot printing step. In this instance, the previously mentioned predetermined distance of travel l of the ink ribbon 22 is selected so that every adjacent two of the colored sections Y, M and C of the ink ribbon 22 have trailing and leading marginal areas, respectively, which are located substantially in registry with the selected one of the subgroups of the heater elements 12 during each dot printing step.

Yellow, magenta and cyanic blue colored dots are in these manners printed on the surface of the record sheet 14 along and throughout the print line $D_p$ during each line forming cycle. Upon completion of each line forming cycle, the drive means 20 associated with the feed roller 16 (FIG. 3) is actuated to drive the record sheet 14 to advance a predetermined distance in the direction of the arrow a. By repetition of such a line forming cycle, patterns of information are thus printed in yellow, magenta and cyanic blue on the surface of the record sheet 14 in accordance with the pattern data contained in the printing information signals $S_i$ supplied to the control circuit 30.

Figure 6:
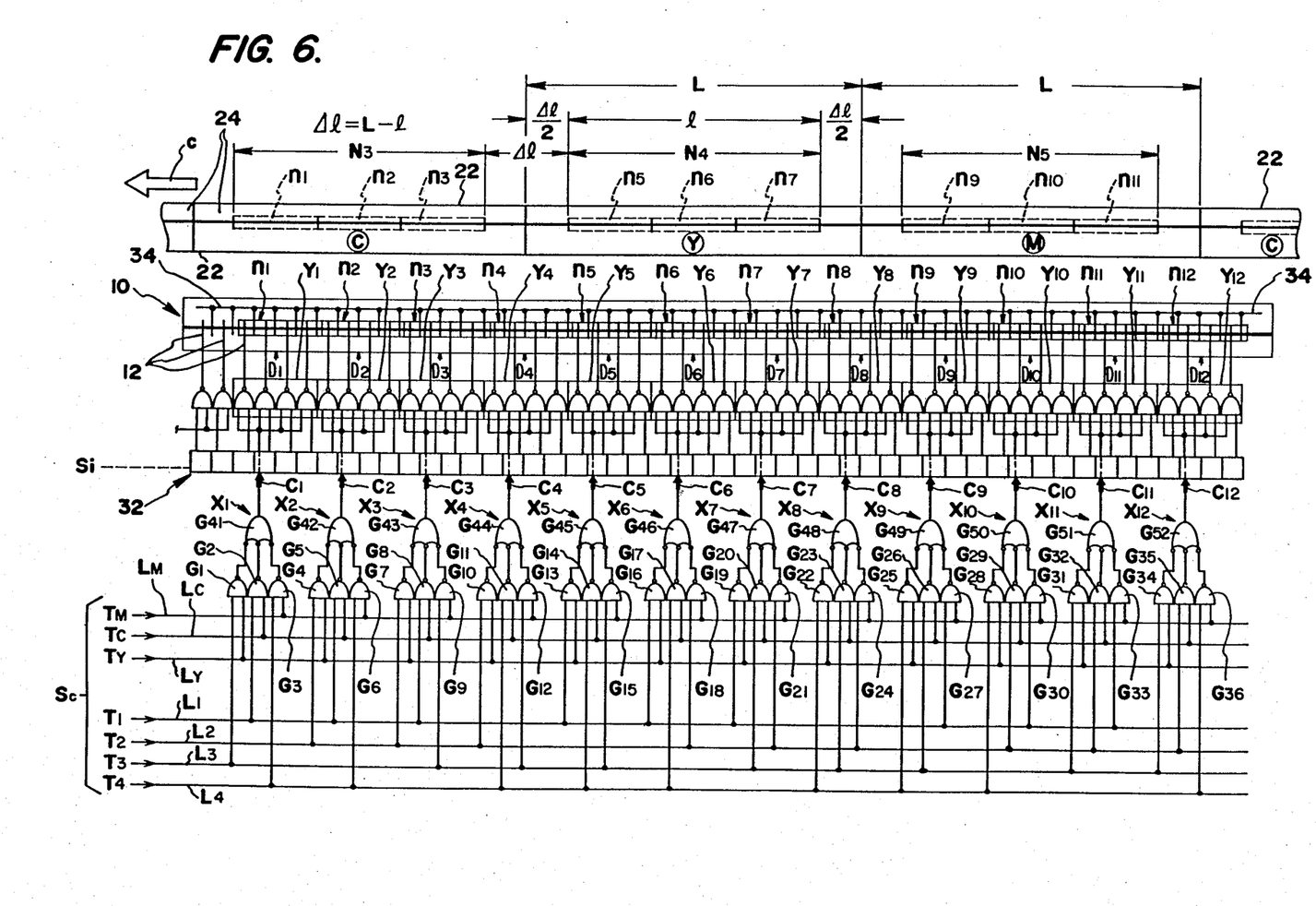
FIG. 6 is a schematic diagram showing the circuit arrangement of a preferred example of a network which forms part of the complete circuitry included in electric control means of the embodiment illustrated in FIG. 3.

FIG. 6 of the drawings shows part of the construction and arrangement of the control circuit 30 in conjunction with the arrangement of the heater elements 12 of the printing head 10 and with the pattern of variegation of the ink ribbon 22 a portion of which is shown at the top of FIG. 6. The individual heater elements 12 of the printing head 10 form a plurality of subgroups $n_1$, $n_2$, $n_3$, ... $n_{12}$ each consisting of, for example, four heater elements 12 as shown. During each dot printing step, every fourth subgroup such as the subgroups $n_4$, $n_8$ and $n_{12}$ as shown in FIG. 6 forms each of the previously mentioned clearance areas of the printing head and, thus, combinations each of three successive subgroups intervening between two adjacent clearance areas as shown in FIG. 6 form the previously mentioned operable heater element zones of the printing head 10. During the dot printing step of the circuit arrangement shown in FIG. 6, the subgroups $n_4$, $n_8$ and $n_{12}$ of the heater elements 12 are assumed to form clearance areas of the printing head and the combinations each of three successive subgroups such as the subgroups $n_1$ to $n_3$, $n_5$ to $n_7$, and $n_9$ to $n_{11}$ are assumed to form the operable heater element zones $N_3$, $N_4$ and $N_5$, respectively, of the printing head 10. Each of the groups each consisting of three subgroups forming an operable heater element zone and one subgroup forming a clearance area consists of the previously mentioned first number of heater elements 12 which are sixteen in the shown embodiment. The leading two of the heater elements 12 of each subgroup forming the clearance area between two successive operable heater element zones form an inoperable heater element zone trailing from the preceding operable heater element zone and the trailing two of the heater elements 12 of each subgroup forming the clearance area form an inoperable heater element zone leading from the subsequent operable heater element zone. Thus, the previously mentioned third number of each inoperable heater element zone is assumed to be two in the shown embodiment.

The circuit arrangement shown in FIG. 6 forms part of the control circuit 30 shown in FIG. 3 and is assumed to include heater elements 12 which form the operable heater element zones $N_3$, $N_4$ and $N_5$ each consisting of the previously mentioned secon number of heater elements 12 during a certain dot printing step. The ink ribbon 22 in this dot printing step is assumed to be located so that successive first-colored, second-colored and third-colored sections Y, M and C of the ribbon 22 are in registry with these operable heater element zones $N_3$, $N_4$ and $N_5$, respectively, of the printing head 10.

In FIG. 6, the circuit arrangement having the heater elements 12 thus located in conjunction with the three colored sections Y, M and C during a certain imaginary dot printing step is shown comprising a total of eleven, first to eleventh, zone control circuits $X_1$, $X_2$, $X_3$ ... $X_{12}$ responsive to the print control signals $S_c$. These zone control circuits $X_1$, $X_2$, $X_3$ ... $X_{12}$ are associated with the individual subgroups $n_1$, $n_2$, $n_3$ ... $n_{12}$, respectively, of the heater elements 12 and are adapted to determine which of the subgroups are to form operable heater element zones and which of the subgroups are to form inoperable heater element zones during each dot printing step. Each of these first to twelfth zone control circuits $X_1$, $X_2$, $X_3$ ... $X_{12}$ comprises three, first to third, two-input logic NAND gates and thus there are shown a total of thirty six NAND gates $G_1$ to $G_{36}$ which consist of NAND gates $G_1$ to $G_3$ forming part of the first zone control circuit $X_1$, NAND gates $G_4$ to $G_6$ forming part of the second zone control circuit $X_2$, and so forth. The zone control circuits $X_1$ to $X_{36}$ further comprise NOR gates $G_{41}$, $G_{42}$, $G_{43}$, ... to $G_{52}$, respectively, each of which has three input terminals respectively connected to the output terminals of the three logic NAND gates included in each of the zone control circuits $X_1$, $X_2$, $X_3$ ... $X_{12}$.

The first to twelfth NOR gates $G_{41}$ to $G_{52}$ of the circuit arrangement shown in FIG. 6 have their output terminals connected to twelve, first to twelfth, selective heater actuation control circuits $Y_1$, $Y_2$, $Y_3$ ... $Y_{12}$, respectively, each of which is composed of a parallel combination of four two-input logic NAND gates. Each of the NAND gates constituting each of these selective heater actuation control circuits $Y_1$, $Y_2$, $Y_3$ ... $Y_{12}$ has one of its two output terminals connected to the output terminal of each of the NOR gates $G_{41}$ to $G_{52}$ each forming part of each of the zone control circuits $X_1$, $X_2$, $X_3$ ... $X_{12}$, respectively. The other input terminals of the NAND gates of the heater actuation control circuits $Y_1$, $Y_2$, $Y_3$ ... $Y_{12}$ are respectively connected to the output terminals of the individual stages of a shift register 32. Though not shown, the shift register 32 is connected to, for example, a computer and is operative to memorize the printing information signals $S_i$ representative, in the form of logic 0 and 1 pulses, of the patterns and color distribution of the information to be printed during successive dot printing steps. The heater elements 12 to be actuated during each dot printing step are thus selected by, for example, the logic 1 signals supplied from some stages of the shift register 32. The NAND gates of the selective heater actuation control circuits $Y_1$, $Y_2$, $Y_3$ ... $Y_{12}$ have their output terminals respectively connected to the heater elements 12 of the printing head 10. These heater elements 12 of the printing head 10 in turn are connected by a line 34 to a suitable source of power (not shown). The circuit arrangement shown in FIG. 6 forms part of a complete circuitry of the apparatus embodying the present invention. Thus, the complete circuitry further comprises circuits, similar to the zone control circuits $X_1$, $X_2$, $X_3$ ... $X_{12}$ and circuits similar to the selective heater actuation control circuits $Y_1$, $Y_2$, $Y_3$ ... $Y_{12}$, though not shown in the drawings.

The print control signals $S_c$ to be supplied to the control circuit 30 include a first group of four, first to fourth, zone select control signals $T_1$ to $T_4$ and a second group of three, first to third, duration control signals $T_Y$, $T_M$ and $T_C$ as indicated at the left of FIG. 6. The first to fourth zone select control signals $T_1$ to $T_4$ of the first group are supplied in the form of logic 0 and/or 1 pulses and are effective to determine which of the subgroups $n_1$, $n_2$, $n_3$, ... $n_{12}$ of the heater elements 12 are to form operable and inoperable heater element zones during each dot printing step. The duration control signals $T_Y$, $T_M$ and $T_C$ of the second group are also supplied in the form of logic 0 and/or 1 pulses and have different pulsewidths to determine the time durations for which selected ones of the heater elements 12 of the operable heater element zones determined on the basis of the zone select control signals $T_1$ to $T_4$ are to be maintained energized during each dot printing step. The optimum time durations for which the heater elements 12 of the printing head 10 are to be maintained energized during dot printing steps differ from one of the colors of the prints to be produced to another and, for this reason, the respective pulsewidths of the print control signals $T_Y$, $T_M$ and $T_C$ are selected to be optimum for the generation of colors by the colored sections Y, M and C of the ink ribbon 22, viz., the yellow, magenta and cyanic blue colors to be produced by the colored sections Y, M and C, respectively. In the circuit arrangement shown in FIG. 6, the zone select control signals $T_1$ to $T_4$ and the duration control signals $T_Y$, $T_M$ and $T_C$ are supplied to the NAND gates $G_1$ to $G_{36}$ of the zone control circuits $X_1$, $X_2$, $X_3$ ... $X_{12}$ in accordance with the following schedules.

The first zone select control signal $T_1$ is supplied through a line $L_1$ to one input terminal of each of the second NAND gates $G_2$, $G_5$ and $G_8$ of the first, second and third zone control circuits $X_1$, $X_2$ and $X_3$; the first NAND gates $G_{13}$, $G_{16}$ and $G_{19}$ of the fifth, sixth and seventh zone control circuits $X_5$, $X_6$ and $X_7$; and the third NAND gates $G_{27}$, $G_{30}$ and $G_{33}$ of the ninth, tenth and eleventh zone control circuits $X_9$, $X_{10}$ and $X_{11}$, respectively. The second zone select control signal $T_2$ is supplied through a line $L_2$ to one input terminal of each of the first NAND gates $G_4$, $G_7$ and $G_{10}$ of the second, third and fourth zone control circuits $X_2$, $X_3$ and $X_4$; the third NAND gates $G_{18}$, $G_{21}$ and $G_{24}$ of the sixth, seventh and eighth zone control circuits $X_6$, $X_7$ and $X_8$; and the second NAND gates $G_{29}$, $G_{32}$ and $G_{35}$ of the tenth, eleventh and twelfth zone control circuits $X_{10}$, $X_{11}$ and $X_{12}$, respectively. The third zone select control signal $T_3$ is supplied through a line $L_3$ to one input terminal of each of the first NAND gate $G_1$ of the first zone control circuit $X_1$; the third NAND gates $G_9$, $G_{12}$ and $G_{15}$ of the third, fourth and fifth zone control circuits $X_3$, $X_4$ and $X_5$; the second NAND gate $G_{20}$, $G_{23}$, $G_{26}$ of the seventh, eighth and ninth zone control circuits $X_7$, $X_8$ and $X_9$; and the first NAND gates $G_{31}$ and $G_{34}$ of the eleventh and twelfth zone control circuits $X_{11}$ and $X_{12}$, respectively. The fourth zone select control signal $T_4$ is supplied through a line $L_4$ to one input terminal of each of the third NAND gates $G_3$ and $G_6$ of the first and second zone control circuits $X_1$ and $X_2$; the second NAND gates $G_{11}$, $G_{14}$ and $G_{17}$ of the fourth, fifth and sixth zone control circuits $X_4$, $X_5$ and $X_6$; the first NAND gates $G_{22}$, $G_{25}$ and $G_{28}$ of the eighth, ninth and tenth zone control circuits $X_8$, $X_9$ and $X_{10}$; and the third NAND gate $G_{36}$ of the twelfth zone control circuit $X_{12}$, respectively. On the other hand, the first duration control signal $T_Y$ is supplied through a line line $L_y$ to the other input terminal of each of the first the NAND gates of all the zone control circuits $X_1$, $X_2$, $X_3$ ... $X_{12}$. The second duration control signal $T_Y$ is supplied through a line $L_m$ to the other input terminal of each of the third NAND gates of all the zone control circuits $X_1$, $X_2$, $X_3$ ... $X_{12}$. The third duration control signal $T_C$ is supplied through a line $L_c$ to the other input terminal of each of the second NAND gates of all the zone control circuits $X_1$, $X_2$, $X_3$ ... $X_{12}$. The zone select control signals $T_1$ to $T_4$ and the duration control signals $T_Y$, $T_M$ and $T_C$ thus distributed to the circuit arrangement shown in FIG. 6 are supplied similarly to the counterparts of the NAND gates $G_1$ to $G_{36}$ in the other zone control circuits (not shown) of the complete circuitry through the lines $L_1$ to $L_4$ and the lines $L_y$, $L_m$ and $L_c$.

Description will now be made with concurrent reference to FIGS. 5 and 6 regarding the modes of operation of the multicolor thermal printing apparatus having the printing head 10 and the control circuit 30 constructed and arranged as hereinbefore described.

Prior to the start of operation, the ink ribbon 22 to be used in the printing apparatus is position adjusted with respect to the printing head 10 in such a manner that the colored sections 24 of the ink ribbon 22 have their effective printing areas located correctly in registry with the operable heater element zones, respectively, of the heater elements 12 and their leading and trailing marginal or ineffective areas (indicated at g, g' and g" in the diagram (A) of FIG. 5) located in registry with the inoperable heater element zones, respectively, of the heater elements 12 throughout the print line R.

For purposes of description it is assumed that the ink ribbon 22 has the colored sections Y, M and C located as shown in the diagram (A) of FIG. 5 during the first dot printing step of a line forming cycle. In this instance, the ink ribbon 22 has its colored sections Y, M and C located in registry with the operable heater element zones $N_1$, $N_2$ and $N_3$ and the operable heater element zones $N_4$, $N_5$ and $N_6$, respectively, in this sequence as will also be understood from FIG. 6. During the first dot printing step, a logic 1 pulse is supplied as the first zone select control signal $T_1$ to each of the second NAND gates $G_2$, $G_5$ and $G_8$ of the first, second and third zone control circuits $X_1$, $X_2$ and $X_3$; the first NAND gates $G_{13}$, $G_{16}$ and $G_{19}$ of the fifth, sixth and seventh zone control circuits $X_5$, $X_6$ and $X_7$; and the third NAND gates $G_{27}$, $G_{30}$ and $G_{33}$ of the ninth, tenth and eleventh zone control circuits $X_9$, $X_{10}$ and $X_{11}$, respectively, through the line $L_1$ as previously noted. Simultaneously when the first zone select control signal $T_1$ is thus transmitted to each of these NAND gates, logic 1 pulses having different pulsewidths are supplied as the first, second and third duration control signals $T_Y$, $T_C$ and $T_M$ to the first, third and second NAND gates, respectively, of each of the zone control circuits $X_1$ to $X_{12}$ through the lines $L_y$, $L_m$ and $L_c$. In each of the first to third zone control circuits $X_1$, $X_2$ and $X_3$, there thus appears a logic 1 pulse at the output terminal of each of the first and third NAND gates $G_1$, $G_3$; $G_4$, $G_6$; and $G_7$, $G_9$ in the presence of the logic 1 and 0 pulses at the input terminals of each of the NAND gates $G_1$, $G_3$; $G_4$, $G_6$; and $G_7$, $G_9$. As a consequence, logic 1 pulses $C_1$, $C_2$ and $C_3$ having a pulsewidth equal to that of the third duration control signal $T_C$ supplied to the NAND gates $G_2$, $G_5$ and $G_8$ appear at the output terminals of the NOR gates $G_{41}$, $G_{42}$ and $G_{43}$ of the zone control circuits $X_1$, $X_2$ and $X_3$, respectively. Likewise, logic 1 pulses $C_5$, $C_6$ and $C_7$ having a pulsewidth equal to that of the first duration control signal $T_Y$ supplied to the NAND gates $G_{13}$, $G_{16}$ and $G_{19}$ appear at the output terminals of the NOR gates $G_{45}$, $G_{46}$ and $G_{47}$ of the zone control circuits $X_5$, $X_6$ and $X_7$, respectively. Furthermore, logic 1 pulses $C_9$, $C_{10}$ and $C_{11}$ having a pulsewidth equal to that of the second duration control signal $T_M$ supplied to the NAND gates $G_{27}$, $G_{30}$ and $G_{33}$ appear at the output terminals of the NOR gates $G_{49}$, $G_{50}$ and $G_{51}$ of the zone control circuits $X_9$, $X_{10}$ and $X_{11}$, respectively. Thus, the NAND gates forming the selective heater actuation circuits $Y_1$ to $Y_3$; $Y_5$ to $Y_7$; and $Y_9$ to $Y_{10}$ are made ready to produce logic 0 output pulses so that the subgroups $n_1$ to $n_3$; $n_5$ to $n_7$; and $n_9$ to $n_{11}$ of the heater elements 12 are selected as the operable heater element zones $N_3$, $N_4$ and $N_5$, respectively, in the portion of the printing head 10 shown in FIG. 6. Under these conditions, the third-colored, first-colored and second-colored sections C, Y and M are located in registry with these operable heater element zones $N_3$, $N_4$ and $N_5$, respectively, as shown in FIG. 6 and in the diagram (A) of FIG. 5. Prior to the transmission of the control signals $T_1$, $T_Y$, $T_M$ and $T_C$ to the zone control circuit $X_1$, $X_2$, $X_3$, ... $X_{12}$ as discussed above, the printing information signals $S_i$ representative, in the form of the bits of the logic 0 and/or 1 states, of the patterns and color distribution of the information to be printed are loaded into the shift register 32 from, for example, a computer (not shown). Of the four NAND gates forming each of the selective heater actuation circuits $Y_1$ to $Y_3$; $Y_5$ to $Y_7$; and $Y_9$ to $Y_{11}$, the NAND gates connected to those stages of the shift register 32 which contain bits of the logic 1 state are caused to produce logic 0 pulses $D_1$ to $D_3$; $D_5$ to $D_7$; and $D_9$ to $D_{11}$ (FIG. 6) at their output terminals in response to the logic 1 output pulse from the heater actuation circuits. Out of the heater elements 12 contained in each of the subgroups $n_1$ to $n_3$; $n_5$ to $n_7$; and $n_9$ to $n_{11}$ of the printing head 10, those connected to the NAND gates thus caused to produce the logic 0 output pulses in each of the selective heater actuation circuits $Y_1$ to $Y_3$; $Y_5$ to $Y_7$; and $Y_9$ to $Y_{11}$ are actuated to permit a current to flow through these heater elements 12 via the line 34. It therefore follows that each of the colored sections C, Y and M held in registry with the operable heater element zones $N_3$, $N_4$ and $N_5$ as shown in FIG. 6 and the diagram (A) of FIG. 5 is heated and activated by the heat generated by these particular heater elements 12 of the printing head 10. Cyanic blue, yellow and magenta colored dots are therefore printed on the record sheet 14 along the print line R underneath the particular colored sections C, Y and M, respectively. Generation of heat by these heater elements 12 lasts for periods of time dictated by the pulse-widths of the duration control signals $T_Y$, $T_M$ and $T_C$ supplied to the zone control circuit $X_1$ to $X_3$; $X_5$ to $X_7$; and $X_9$ to $X_{11}$, respectively.

While the selected ones of the heater elements 12 forming each of the subgroups $n_1$ to $n_3$; $n_5$ to $n_7$; and $n_9$ to $n_{11}$ of the printing head 10 are being actuated as above described, there are present logic 1 pulses at the output terminals of the selective heater actuation circuits $Y_4$, $Y_8$ and $Y_{12}$ shown in FIG. 6. Under these conditions, the heater elements 12 forming the subgroups $n_4$, $n_8$ and $n_{12}$ of the printing head 10 respectively associated with these heater actuation circuits remain inactive, forming the previously mentioned clearance areas g, g' and g between the operable heater element zones $N_3$, $N_4$, $N_5$ and $N_6$ of the heater elements 12 shown in the diagram (A) of FIG. 5. These clearance areas g, g' and g are located in registry with the inoperable heater element zones of the ink ribbon 22 so that there are no colored dots printed on the record sheet 14 below these areas of the ribbon 22.

Upon completion of the first dot printing step, the ink ribbon 22 is driven to travel the distance l in the direction r with respect to the printing head 10 with the result that the portion under consideration of the ink ribbon 22 has its colored sections Y, M and C located as shown in the diagram (B) of FIG. 5. During the second dot printing step, a logic 1 pulse is supplied as the second zone select control signal $T_2$ to each of the first NAND gates $G_4$, $G_7$ and $G_{10}$ of the second, third and fourth zone control circuits $X_2$, $X_3$ and $X_4$; the third NAND gates $G_{18}$, $G_{21}$ and $G_{24}$ of the sixth, seventh and eighth zone control circuits $X_6$, $X_7$ and $X_8$; and the second NAND gates $G_{29}$, $G_{32}$ and $G_{35}$ of the tenth, eleventh and twelfth zone control circuits $X_{10}$, $X_{11}$ and $X_{12}$, respectively, through the line $L_2$. Simultaneously when the second zone select control signal $T_2$ is thus transmitted to each of these NAND gates, logic 1 pulses having different pulsewidths are supplied as the first, second and third duration control signals $T_Y$, $T_M$ and $T_C$ to the first, third and second NAND gates, respectively, of each of the zone control circuits $X_1$ to $X_{12}$ through the lines $L_Y$, $L_M$ and $L_C$. As a consequence, logic 1 pulses $C_2$, $C_3$ and $C_4$ having, a pulsewidth equal to that of the first duration control signal $T_Y$ supplied to the NAND gates $G_4$, $G_7$ and $G_{10}$ appear at the output terminals of the NOR gates $G_{42}$, $G_{43}$ and $G_{44}$ of the zone control circuits $X_2$, $X_3$ and $X_4$, respectively. Likewise, logic 1 pulses $C_6$, $C_7$ and $C_8$ having a pulsewidth equal to that of the second duration control signal $T_M$ supplied to the NAND gates $G_{18}$, $G_{21}$ and $G_{24}$ appear at the output terminals of the NOR gates $G_{46}$, $G_{47}$ and $G_{48}$ of the zone control circuits $X_6$, $X_7$ and $X_8$, respectively. Furthermore, logic 1 pulses $C_{10}$, $C_{11}$ and $C_{12}$ having a pulsewidth equal to that of the third duration control signal $T_C$ supplied to the NAND gates $G_{29}$, $G_{32}$ and $G_{35}$ appear at the output terminals of the NOR gates $G_{50}$, $G_{51}$ and $G_{52}$ of the zone control circuits $X_{10}$, $X_{11}$ and $X_{12}$, respectively. Thus, the NAND gates forming the selective heater actuation circuits $Y_2$ to $Y_4$; $Y_6$ to $Y_8$; and $Y_{10}$ to $Y_{12}$ are made ready to produce logic 0 output pulses so that the subgroups $n_2$ to $n_4$; $n_6$ to $n_8$; and $n_{10}$ to $n_{12}$ of the heater elements 12 are selected as the operable heater element zones $N_4$, $N_5$ and $N_6$, respectively, as illustrated in the diagram (B) of FIG. 5. Of the four NAND gates forming each of the selective heater actuation circuits $Y_2$ to $Y_4$; $Y_6$ to $Y_8$; and $Y_{10}$ to $Y_{12}$, the NAND gates connected to those stages of the shift register 32 which contain bits of the logic 1 state are caused to produce logic 0 pulses $D_2$ to $D_4$; $D_6$ to $D_8$; and $D_{10}$ to $D_{12}$ (FIG. 6) at their output terminals in response to the logic 1 output pulse from the heater actuation circuits. Out of the heater elements 12 contained in each of the subgroups $n_2$ to $n_4$; $n_6$ to $n_8$; and $n_{10}$ to $n_{12}$ of the printing head 10, those connected to the NAND gates thus caused to produce the logic 0 output pulses in each of the selective heater actuation circuits $Y_2$ to $Y_4$; $Y_6$ to $Y_8$; and $Y_{10}$ to $Y_{12}$ are actuated to permit a current to flow through these heater elements 12 via the line 34.

The ink ribbon 22 driven to move the distance l from the position shown in the diagram (A) to the position shown in the diagram (B) of FIG. 5 invariably has its colored sections Y, M and C located in registry with the operable heater element zones $N_1$, $N_2$ and $N_3$ and the operable heater element zones $N_4$, $N_5$ and $N_6$, respectively, thus formed by the heater elements 12 of the subgroups $n_2$ to $n_4$; $n_6$ to $n_8$; and $n_{10}$ to $n_{12}$ of the printing head 10 as will be seen from the diagram (B) of FIG. 5. Each of the colored sections Y, M and C thus located in registry with the operable heater element zones $N_1$, $N_2$ and $N_3$ and the operable heater element zones $N_4$, $N_5$ and $N_6$, respectively, is heated and activated by the heat generated by selected ones of these particular heater elements 12. While the selected ones of the heater elements 12 forming each of the subgroups $n_2$ to $n_4$; $n_6$ to $n_8$; and $n_{10}$ to $n_{12}$ of the printing head 10 are being actuated as above described, there are present logic 1 pulses at the output terminals of the selective heater actuation circuits $Y_1$, $y_5$ and $Y_9$ shown in FIG. 6. Under these conditions, the heater elements 12 forming the subgroups $n_1$, $n_5$ and $n_9$ of the printing head 10 respectively associated with these heater actuation circuits remain inactive as illustrated in the diagram (B) of FIG. 5.

During the subsequent dot printing step, the ink ribbon 22 is further driven to travel the distance l in the direction r with respect to the printing head 10 with the result that the portion under consideration of the ink ribbon 22 has its colored sections Y, M and C located as shown in the diagram (C) of FIG. 5. During this third dot printing step, a logic 1 pulse is supplied as the third zone select control signal $T_3$ to each of the first NAND gate $G_1$ of the first zone control circuit $X_1$; the third NAND gates $G_9$, $G_{12}$ and $G_{15}$ of the third, fourth and fifth zone control circuits $X_3$, $X_4$ and $X_5$; the second NAND gates $G_{20}$, $G_{23}$ and $G_{26}$ of the seventh, eighth and ninth zone control circuits $X_7$, $X_8$ and $X_9$; and the first NAND gates $G_{31}$ and $G_{34}$ of the eleventh and twelfth zone control circuits $X_{11}$ and $X_{12}$, respectively, through the line $L_3$. As a consequence, logic 1 pulses $C_1$; $C_3$ to $C_5$; $C_7$ to $C_9$; and $C_{11}$ and $C_{12}$ appear at the output terminals of the NOR gates $G_{41}$; $G_{43}$ to $G_{45}$; $G_{47}$ to $G_{49}$; and $G_{51}$ and $G_{52}$ of the zone control circuits $X_1$; $X_3$ to $X_5$; $X_7$ to $X_9$; and $X_{11}$ and $X_{12}$, respectively. Thus, the NAND gates forming the selective heater actuation circuits $Y_1$; $Y_3$ to $Y_5$; $Y_7$ to $Y_9$; and $Y_{11}$ and $Y_{12}$ are caused to produce logic 1 output pulses so that the subgroup $n_1$ is selected as part of the operable heater element zone $N_4$, the subgroups $n_3$ to $n_5$ and the subgroups $n_7$ to $n_9$ selected as the operable heater element zones $N_5$ and $N_6$, respectively, and the subgroups $n_{11}$ and $n_{12}$ selected as part of the operable heater element zone $N_7$, in the portion of the printing head 10 shown in the diagram (C) of, FIG. 5. Of the four NAND gates forming each of the selective heater actuation circuits $Y_1$; $Y_3$ to $Y_5$; $Y_7$ to $Y_9$; and $Y_{11}$ and $Y_{12}$, the NAND gates connected to those stages of the shift register 32 which contain bits of the logic 1 state are made ready to produce logic 0 pulses $D_1$; $D_3$ to $D_5$; $D_7$ to $D_9$; and $D_{11}$ and $D_{12}$ (FIG. 6) at their output terminals in response to the logic 1 output pulse from the heater actuation circuits. Out of the heater elements 12 contained in each of the subgroups $n_1$; $n_3$ to $n_5$; $n_7$ to $n_9$; and $n_{11}$ and $n_{12}$ of the printing head 10, those connected to the NAND gates thus caused to produce the logic 0 output pulses in each of the selective heater actuation circuits $Y_1$; $Y_3$ to $Y_5$; $Y_7$ to $Y_9$; and $Y_{11}$ and $Y_{12}$ are actuated to permit a current to flow through these heater elements 12. Each of the colored sections Y, M and C of the ink ribbon 22 is accordingly heated and activated by the heat generated by these particular heater elements 12 of the printing head 10. While the selected ones of the heater elements 12 forming each of the subgroups $n_1$; $n_3$ to $n_5$; $n_7$ to $n_9$; and $n_{11}$ and $n_{12}$ of the printing head 10 are being actuated as above described, there are present logic 1 pulses at the output terminals of the selective heater actuation circuits $Y_2$, $Y_6$ and $Y_{10}$ shown in FIG. 6. Under these conditions, the heater elements 12 forming the subgroups $n_2$, $n_6$ and $n_{10}$ of the printing head 10 respectively associated with these heater actuation circuits remain inactive as illustrated in the diagram (C) of FIG. 5.

During the fourth dot printing step, the ink ribbon 22 is further driven to travel the distance l in the direction r with respect to the printing head 10 so that the portion under consideration of the ribbon 22 has its colored sections Y, M and C located as shown in the diagram (D) of FIG. 5. A logic 1 pulse is now supplied as the fourth zone select control signal $T_4$ to each of the third NAND gates $G_3$ and $G_6$ of the first and second zone control circuits $X_1$ and $X_2$; the second NAND gates $G_{11}$, $G_{14}$ and $G_{17}$ of the fourth, fifth and sixth zone control circuits $X_4$, $X_5$ and $X_6$; the first NAND gates $G_{22}$, $G_{25}$ and $G_{28}$ of the eighth, ninth and tenth zone control circuits $X_8$, $X_9$ and $X_{10}$; and the third NAND gate $G_{36}$ of the twelfth zone control circuit $X_{12}$, respectively, through the lines $L_4$. As a consequence, logic 1 pulses $C_1$ and $C_2$; $C_4$ to $C_6$; $C_8$ to $C_{10}$; and $C_{12}$ appear at the output terminals of the NOR gates $G_{41}$ and $G_{42}$; $G_{44}$ to $G_{46}$; $G_{48}$ to $G_{50}$; and $G_{52}$ of the zone control circuits, respectively. Thus, the NAND gates forming the selective heater actuation circuits $Y_1$ and $Y_2$; $Y_4$ to $Y_6$; $Y_8$ to $Y_{10}$; and $Y_{12}$ are made ready to produce logic 0 output pulses so that the subgroups $n_1$ and $n_2$ are selected as part of the operable heater element zone $N_5$, the subgroups $n_4$ to $n_6$ and the subgroups $n_8$ to $n_{10}$ selected as the operable heater element zones $N_6$ and $N_7$, respectively, and the subgroup $n_{12}$ selected as part of the operable heater element zone $N_8$, in the portion of the printing head 10 shown in the diagram (D) of FIG. 5. Of the four NAND gates forming each of the selective heater actuation circuits $Y_1$ and $Y_2$; $Y_4$ to $Y_6$; $Y_8$ to $Y_{10}$; and $Y_{12}$, the NAND gates connected to those stages of the shift register 32 which contain bits of the logic 1 state are caused to produce logic 0 pulses $D_1$ and $D_2$; $D_4$ to $D_6$; $D_8$ to $D_{10}$; and $D_{12}$ (FIG. 6) at their output terminals in response to the logic 1 output pulse from the heater actuation circuits. Out of the heater elements 12 contained in each of the subgroups $n_1$ and $n_2$; $n_4$ to $n_6$; $n_8$ to $n_{10}$; and $n_{12}$ of the printing head 10, those connected to the NAND gates thus caused to produce the logic 0 output pulses in each of the selective heater actuation circuits $Y_1$ and $Y_2$; $Y_4$ to $Y_6$; $Y_8$ to $Y_{10}$; and $Y_{12}$ are actuated to permit a current to flow through these heater elements 12. Each of the colored sections Y, M and C of the ink ribbon 22 is accordingly heated and activated by the heat generated by these particular heater elements 12 of the printing head 10. While the selected ones of the heater elements 12 forming each of the subgroups $n_1$ and $n_2$; $n_4$ to $n_6$; $n_8$ to $n_{10}$; and $n_{12}$ of the printing head 10 are being actuated as above described, there are present logic 1 pulses at the output terminals of the selective heater actuation circuits $Y_3$, $Y_7$ and $Y_{11}$ shown in FIG. 6. Under these conditions, the heater elements 12 forming the subgroups $n_3$, $n_7$ and $n_{11}$ of the printing head 10 respectively associated with these heater actuation circuits remain inactive as illustrated in the diagram (D) of FIG. 5.

As a result of these four consecutive dot printing steps, a line composed of myriads of dots of one, two or three colors is printed on the record sheet 14 along the print line R by selective actuation of the heater elements 12 of the subgroups $n_1$, $n_2$, $n_3$, . . . $n_{12}$ of the printing head 10 in accordance with the print control signals $S_c$ and printing information signals $S_i$ supplied to the control circuit 30. After the line forming cycle consisting of these four dot printing steps, the record sheet 14 (FIG. 3) is driven to forwardly advance a predetermined distance for another succession of four dot printing steps.

While it has been assumed that the length l of the operable heater element zones of the printing head 10, viz., the distance which the operable heater element zones and the ink ribbon 22 are to be caused to travel during each dot printing step are equal to three thirds of the length L of the colored sections of the ribbon 22, this is simply for the purpose of description and thus the relationship between the lengths l and L may be modified in numerous manners insofar as each of the colored sections of the ink ribbon 22 has its effective printing area located in registry with, for example, three of the subgroups of each group consisting of, for example, four subgroups of the heater elements 12 of the printing head during each of the dot printing steps and the ineffective areas trailing and leading from every adjacent two of the colored sections are located in registry with one of the subgroups of the heater elements 12.

What is claimed is:

1. A method of printing dots of at least two different colors including first and second colors on a record sheet with use of a printing head having a multiplicity of heater elements which are arranged in an array extending along a substantially straight print line and which are operative to produce heat independently of one another when actuated and an elongated heat-sensitive ink ribbon extending between the record sheet and the array of said heater elements and having a series of recurrent colored sections which are contiguous to one another and which are inked in said colors, said heater elements comprising a succession of groups each having a predetermined number of successive subgroups each consisting of a predetermined number of heater elements and forming a zone having a predetermined length, the colored sections of said first and second colors occurring, lengthwise of the ribbon, successively and recurrently with a unit series including one colored section of the first color and one colored section of the second color, all the colored sections of the ink ribbon having a predetermined length, the method having a succession of line forming cycles each for forming a single line of dots in at least one of said different colors on the record sheet, each of the line forming cycles consisting of a predetermined number of dot printing steps each comprising driving the record sheet to advance a predetermined distance across said print line in a direction substantially perpendicular to the print line during each of said line forming cycles;

driving said ink ribbon to travel a predetermined distance with respect to said printing head in a predetermined direction angled to the direction of travel of the record sheet during each dot printing step, said predetermined distance of travel of the ink ribbon being substantially equal to said predetermined length of said zone and being smaller than said predetermined length of said colored sections of the ink ribbon;

on the basis of control signals supplied from an external source, selecting out of said heater elements of the printing head the heater elements to be actuated to generate heat during each dot printing step; and actuating the selected heater elements for producing dots of at least one of said colors on said ink ribbon during each dot printing step, wherein the heater elements to be actuated to generate heat during each dot printing step are selected by selecting one of the subgroups of each of said groups and selecting particular heater elements out of the heater elements of the non-selected subgroups during each dot printing step, and wherein said predetermined distance of travel of the ink ribbon is selected so that every adjacent two of the colored sections of the ink ribbon have trailing and leading marginal areas, respectively, which are located substantially in registry with the selected one of said subgroups during each dot printing step.

2. A method as set forth in claim 1, in which selected one of said subgroups of said heater elements changes from one of the subgroups of each of said groups to another during the successive dot printing steps of each of said line forming cycles.

3. A method as set forth in claim 1 or 2, in which said ink ribbon is driven to travel so that the boundary between every adjacent two of the colored sections thereof is located substantially in registry with the boundary between said marginal areas respectively trailing and leading from every adjacent two of the colored sections of said ink ribbon during each dot printing step.

4. A method as set forth in claim 1 or 2, in which the number of the dot printing steps of each of said line forming cycles is equal to the number of the subgroups of each of said groups of the heater elements.

5. A method as set forth in claim 1 or 2, in which the direction of travel of said ink ribbon is inclined to said print line through a predetermined angle less than 90 degrees on a plane on which the ink ribbon is to travel with respect to said printing head.

6. A method as set forth in claim 1 or 2, in which said control signals comprise a first group of control signals to specify those of said subgroups of the heater elements which are to be selected during each dot printing step and the time durations for which the selected heater elements are to be maintained actuated during each dot printing step and a second group of control signals to specify those of the heater elements of the selected subgroups during each dot printing step.

7. A multi-color thermal printing apparatus for printing dots of at least two different colors including first and second colors on a record sheet, comprising sheet driving means operative to drive said record sheet in a predetermined direction during an interval consisting of a predetermined number of dot printing steps;

a printing head including a multiplicity of heater elements which are arranged in an array extending along a print line substantially perpendicular to the direction of travel of the record sheet and which are operative to produce heat independently of one another when actuated, said heater elements comprising a succession of groups each having a predetermined number of successive subgroups each consisting of a predetermined number of heater elements and forming a zone having a predetermined length;

an elongated heat-sensitive ink ribbon extending between the record sheet and the array of said heater elements and having a series of recurrent colored sections which are contiguous to one another and which are inked in said colors, the colored sections of said first and second colors occurring, lengthwise of the medium, successively and recurrently with a unit series including one colored section of the first color and one colored section of the second color, all the colored sections of the ink ribbon having a predetermined length;

ribbon drive means operative to drive said ink ribbon for movement over a predetermined distance during each dot printing step in a direction which is angled to the direction of travel of the record sheet, said predetermined distance of movement of the ink ribbon being substantially equal to said predetermined length of said zone and being smaller than said predetermined length of said colored sections of the ink ribbon; and control means for selecting out of said heater elements of the printing head the heater elements to be actuated to generate heat for producing dots of at least one of said colors on said ink ribbon during each dot printing step, said control means being operative to select one of the subgroups of each of said groups and selecting out of the heater elements of the non-selected subgroups the particular heater elements to be actuated during each dot printing step, said predetermined distance of travel of the ink ribbon being selected so that every adjacent two of the colored sections of the ink ribbon have trailing and leading marginal areas, respectively, which are located substantially in registry with the selected one of said subgroups during each dot printing step.

8. A multi-color thermal printing apparatus as set forth in claim 7, in which said control means comprises sources of a first control signals representative of particular one of the subgroups-of each of said groups of the heater elements during each dot printing step and of the time durations for which selected ones of said heater elements are to be maintained actuated during each dot printing step, sources of a second group of control signals representative of the pattern of information to be printed during each dot printing step, zone select control means responsive to the first group of control signals and operative to produce output signals each representative of said particular one of the subgroups of each of said groups, and selective heater actuation means responsive to said second group of control signals and to the output signals from said zone select control means and operative to select at least one of the heater elements from each of said non-selected subgroups of each of said groups on the basis of the second group of control signals.

9. A multi-color thermal printing apparatus as set forth in claim 8, in which said first group of control signals include zone select control signals produced sequentially during each dot printing step and representative of said particular one of the subgroups of each of said groups of the heater elements during each dot printing step and duration control signals produced concurrently during each dot printing step and representative of the durations for which selected ones of said heater elements are to be actuated during each dot printing step, said zone select control means comprising a plurality of zone select control circuits each of which is responsive to at least one of said zone select control signals and to each of said duration control signals during each dot printing step, each of said zone select control circuits being operative to produce an output signal in the presence of one of the zone select control signals and one of the duration control signals.

10. A multi-color thermal printing apparatus as set forth in claim 9, in which each of said zone select control circuits comprises a predetermined number of logic NAND gate circuits each having one input terminal responsive to one of said zone select control signals and another input terminal responsive to one of said duration oontrol signals, a logic NOR gate circuit having input terminals respectively connected to the output terminals of said logic NAND gate circuits and an output terminal connected to said selective heater actuation means.

11. A multi-color thermal printing apparatus as set forth in claim 10, in which said selective heater actuation means comprises a plurality of logic NAND gate circuits respectively associated with said heater elements of said printing head and each having one input terminal connected to said NOR gate circuit and another input terminal connected to said signal storage means.

12. A multi-color thermal printing apparatus as set forth in any one of claims 7 to 11, in which said drive means is arranged to drive said ink ribbon to travel with respect to said printing head in a predetermined direction angled to the direction of travel of the record sheet during each dot printing step.

13. A multi-color thermal printing apparatus as set forth in claim 12, in which the direction of travel of said ink ribbon is inclined to said print line through a predetermined angle less than 90 degrees on a plane on which the ink ribbon is to travel with respect to said printing head.

* * * * *